US009476795B1

United States Patent
Cogger et al.

(10) Patent No.: US 9,476,795 B1
(45) Date of Patent: Oct. 25, 2016

(54) OPTICAL-DETECTION SYSTEMS AND METHODS FOR DETERMINING STATE OF ENGAGEMENT OF MATING CONNECTORS, AND EQUIPMENT INCORPORATING SAME

(71) Applicant: Nathaniel Group, Inc., Vergennes, VT (US)

(72) Inventors: Jeffrey S. Cogger, Vergennes, VT (US); Joel N. Melnick, Waltham, VT (US); Christopher J. Hudson, Shelburne, VT (US)

(73) Assignee: Nathaniel Group, Inc., Vergennes, VT (US)

( * ) Notice: Subject to any disclaimer, the term of this patent is extended or adjusted under 35 U.S.C. 154(b) by 0 days.

(21) Appl. No.: 14/514,965

(22) Filed: Oct. 15, 2014

Related U.S. Application Data

(60) Provisional application No. 61/890,943, filed on Oct. 15, 2013.

(51) Int. Cl.
| | | |
|---|---|---|
| G01B 11/28 | (2006.01) | |
| G01M 11/08 | (2006.01) | |
| G01M 11/00 | (2006.01) | |
| G02B 6/38 | (2006.01) | |

(52) U.S. Cl.
CPC ........... *G01M 11/088* (2013.01); *G01M 11/33* (2013.01); *G02B 6/3895* (2013.01)

(58) Field of Classification Search
CPC .......... G01N 19/00; A61M 1/28; F23D 3/16; H02H 3/02; H03K 17/18
See application file for complete search history.

(56) References Cited

U.S. PATENT DOCUMENTS

| | | | |
|---|---|---|---|
| 5,104,242 | A | 4/1992 | Ishikawa |
| 5,135,410 | A | 8/1992 | Kawase et al. |
| 5,222,164 | A | 6/1993 | Bass et al. |
| 5,641,299 | A | 6/1997 | Meguro et al. |
| 6,554,484 | B2 | 4/2003 | Lampert et al. |
| 6,817,906 | B2 | 11/2004 | Zhou |
| 7,699,603 | B2 * | 4/2010 | Furner ................... F21V 23/04 431/289 |
| 7,758,369 | B2 | 7/2010 | Miller et al. |
| 7,814,240 | B2 | 10/2010 | Salgado et al. |
| 7,927,130 | B2 | 4/2011 | Fukuda |
| 8,187,024 | B2 | 5/2012 | Williams et al. |
| 8,556,651 | B1 | 10/2013 | Heitmann et al. |
| 8,626,961 | B2 | 1/2014 | Stenmark et al. |
| 2008/0196519 | A1 * | 8/2008 | Salgado ............. H01R 13/7035 73/865.9 |

(Continued)

FOREIGN PATENT DOCUMENTS

| | | |
|---|---|---|
| JP | S63264883 | 11/1988 |
| WO | 2013191064 | 12/2013 |

*Primary Examiner* — Tarifur Chowdhury
*Assistant Examiner* — Jamil Ahmed
(74) *Attorney, Agent, or Firm* — Downs Rachlin Martin PLLC

(57) ABSTRACT

A connector-engagement-state detection system for detecting states of engagement of a connector with a connector receiver and for detecting one or more fault states within the detection system itself so as to prevent false engagement state information. In some embodiments, the detection system includes a light source that emits detection light and a light sensor that detects the detection light. The connector-receiver and/or connector are configured, and the light source and the light sensor are located relative to one another so that some of the detection light reaches the sensor regardless of whether or not the connector is fully engaged with the connector-receiver. This arrangement allows for the determination of one or more faults within the detection system itself, such as a faulty light source or faulty detector.

32 Claims, 4 Drawing Sheets

(56) References Cited

U.S. PATENT DOCUMENTS

| | | | |
|---|---|---|---|
| 2011/0221601 A1 | 9/2011 | Aguren | |
| 2012/0057263 A1* | 3/2012 | Roscoe | H02H 1/0023 361/63 |
| 2013/0184638 A1* | 7/2013 | Scarpaci | G01V 8/20 604/28 |
| 2014/0021379 A1 | 1/2014 | Yu | |
| 2015/0097598 A1* | 4/2015 | Cronin | H03K 17/18 327/109 |

\* cited by examiner

OPTICAL-DETECTION SYSTEMS AND METHODS FOR DETERMINING STATE OF ENGAGEMENT OF MATING CONNECTORS, AND EQUIPMENT INCORPORATING SAME

RELATED APPLICATION DATA

This application claims the benefit of priority of U.S. Provisional Patent Application No. 61/890,943 filed on Oct. 15, 2013, and titled "OPTICAL-DETECTION SYSTEMS AND METHODS FOR DETERMINING STATE OF ENGAGEMENT OF MATING CONNECTORS, AND EQUIPMENT INCORPORATING SAME" which is incorporated herein by reference in its entirety.

FIELD OF INVENTION

The present invention generally relates to the field of optical equipment. In particular, the present invention is directed to optical-detection systems and methods for determining state of engagement of mating connectors, and equipment incorporating same.

BACKGROUND

Optical connectors are ubiquitous and are used to connect optical conductors, such as optical fibers and optical fiber bundles, to various pieces of equipment and other optical conductors to complete an optical system. Properly engaged optical connectors can become disengaged for any of a variety of reasons, including exposure to vibration and being knocked loose, among others. In complex systems with many optical connectors, such as fiber-optic communications networks, when an optical signal is interrupted, it can be challenging to determine not only the cause of the interruption but the location of the interruption. This is as true for disengaged connectors as it is to damaged conductors and faulty equipment. Even less complex systems can have fault-location issues.

SUMMARY

In one implementation, the present disclosure is directed to a system for determining state of engagement of a connector with a connector receiver. The system includes a detection-light source fixed relative to the connector receiver, the detection-light source designed and configured to emit detection light when the system is operating; and a light sensor fixed relative to each of the connector receiver and the detection-light source, the light sensor designed and configured to detect light of the detection light when the system is operating and to generate an output signal that is proportional to an amount of light reaching the light sensor; wherein the detection-light source and the light sensor are located relative to one another and relative to the connector receiver and the connector so that, when the connector is fully engaged with the connector receiver and the system is operating, the connector blocks a first portion of the detection light from reaching the light sensor and allows a second portion of the detection light to reach the light sensor.

In another implementation, the present disclosure is directed to an apparatus including a connector receiver designed and configured to receive a connector; a connector-engagement-state (CES) system that includes: a detection-light source fixed relative to the connector receiver, the detection-light source designed and configured to emit detection light when the CES system is operating; a light sensor fixed relative to each of the connector receiver and the detection-light source, the light sensor designed and configured to detect light of the detection light when the CES system is operating and to generate an output signal that is proportional to an amount of light reaching the light sensor; and CES detection circuitry in operative communication with the light sensor, the CES detection circuitry designed and configured to, based on the output signal of the light sensor, 1) determine the state of engagement of the connector with the connector receiver and 2) identify a possible fault within the CES system.

In still another implementation, the present disclosure is directed to a cable assembly. The cable assembly including a cable that includes a primary conductor designed and configured to conduct at least one primary signal; and an end; and a cable end-connector secured to the cable at the end and designed and configured for receiving a connector, the cable end-connector including: a connector receiver designed and configured to receive the connector and, when the connector is fully engaged with the connector receiver, provide a path for the at least one primary signal between the connector and the primary conductor; a detection-light source fixed relative to the connector receiver, the detection-light source designed and configured to emit detection light; and a light sensor fixed relative to each of the connector receiver and the detection-light source, the light sensor designed and configured to detect light of the detection light and to generate an output signal that is proportional to an amount of light reaching the light sensor; wherein the detection-light source and the light sensor are located relative to one another and relative to the connector receiver and the connector so that, when the connector is fully engaged with the connector receiver and the detection-light source is operating, the connector blocks a first portion of the detection light from reaching the light sensor and allows a second portion of the detection light to reach the light sensor.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1A:
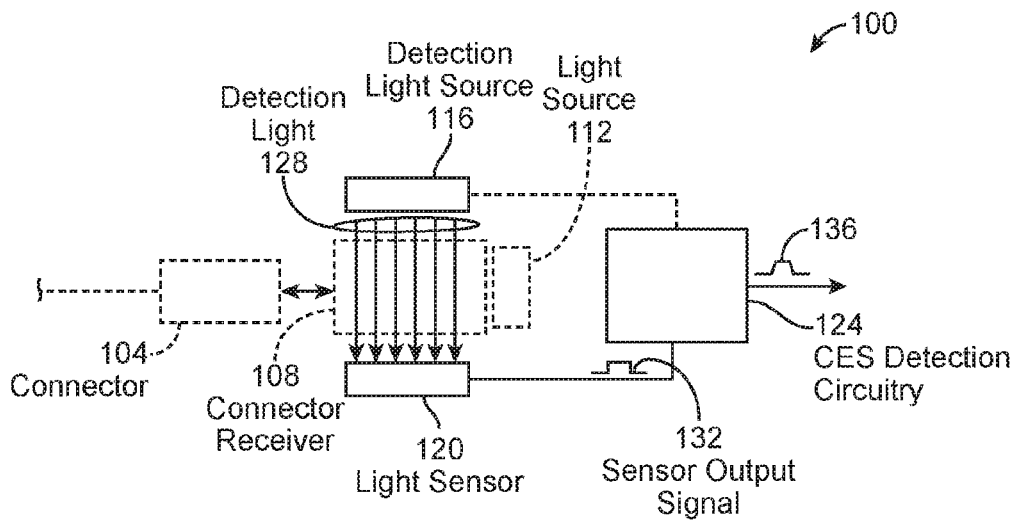
FIG. 1A is a schematic diagram of a connector-engagement-state (CES) detection system in the context of a connector-receiver and mating connector, showing the connector fully disengaged from the connector-receiver.

At a high level, aspects of the present invention are directed to detection systems and methods that can allow for fail-safe determination of the state of engagement of a connector with a mating connector-receiver. In some embodiments, a connector-engagement-state (CES) detection system of the present disclosure includes a detection-light source and a light sensor. The detection-light source and light sensor are located relative to one another and relative to at least a portion of the connector at issue, such that, when the connector is fully and properly engaged with its mating connector receiver, at least a portion of the connector blocks a first portion (spatially) of the detection light from reaching the light sensor, while at the same time allowing a second portion (spatially) of the detection light to reach the light sensor. In some embodiments, the connector-receiver may also be specially configured to allow detection light from the detection-light source to reach the sensor. By allowing the second portion of the light to pass by the connector (or specific portion thereof, such as the tip, a ferrule, etc.) and hit the light sensor, a CES detection system of the present disclosure can provide fail-safe operation for ensuring that the connector is engaged with the connector receiver. This is so because when the system is operating correctly, some of the detection light is always reaching the light sensor, so that the light sensor's output always indicates detection of at least some of the detection light. As described in detail below, this allows the CES detection system to distinguish not only between insertion/non-insertion states, but also to detect one or more faults within the CES detection system itself. In the event that the CES detection system is not operating correctly, such as when the detection-light source is not emitting detection light and the light sensor is not detecting any detection light, the output of the light sensor is of a nature that the CES detection system can distinguish between the fault output and any engagement state output.

Various aspects and features of the present inventions will now be described more fully hereinafter with reference to the accompanying drawings, which illustrate some examples of embodiments and features of the present invention. While embodiments of the invention are described with reference to the figures, the use of these examples by no means limits the scope of the invention, as those skilled in the art will recognize the value obtained from various undescribed combinations of elements and features of the present invention. It is noted that a detection-light source is sometimes referred to herein as an emitter, and the terms "detection-light source" and "emitter" are used interchangeably herein. It is further noted that the terms "light source" and "light sensor" are used in the singular herein for convenience but that the source and detector may include multiple sources (emitters) and multiple sensors, respectively.

Figure 1B:
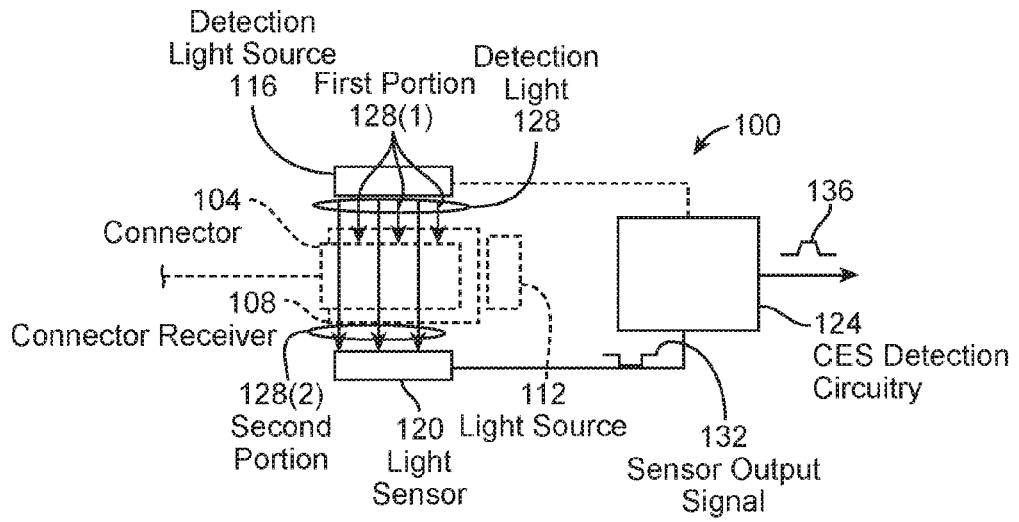
FIG. 1B is a schematic diagram of the CES detection system of FIG. 1A, showing the connector fully engaged with the mating connector-receiver.

Referring now to the drawings, FIGS. 1A and 1B are directed to an exemplary CES detection system 100 that is designed and configured for determining a state of engagement of a connector 104 with a mating connector-receiver 108 in a fail-safe manner. In this example, connector 104 and connector-receiver 108 are of the optical variety, such as may be present in optical cabling that connects to a piece of equipment having a strong light source, here light source 112, such as a laser-light source, that can damage a user's eyes, burn the user, and/or cause other harm if the light source is operating without the connector engaged with the connector-receiver. Consequently, CES detection system 100 may be provided to protect a user of connector 104, or other person or thing, from injury or damage when light source 112 is operating without connector 104 being engaged with connector-receiver 108. For example, CES detection system 100, and light source 112 and/or other components (not shown) that may control the light source, may be configured so that light source 112 is permitted to operate only when it detects that connector 104 is properly engaged with connector-receiver 108.

It is noted that the example of harmful/dangerous light source 112 is merely exemplary. Indeed, such a light source may be replaced by a non-harmful/non-dangerous light source or even a non-light source, such as a source of electrical power, electrical signal, fluid pressure (e.g., liquid, gas), or may be a receiver or sink for any of these things, among others. Fundamentally, the only limit to the application of a CES detection system of the present disclosure, such as CES system 100, is that it is desired to detect the state of engagement of a connector with a connector-receiver, such as connector 104 and connector-receiver 108, while at the same time protecting against false identification of engagement state.

In the context of optical connectors, connector 104 and connector-receiver 108 can be any mating connector and connector receiver used for conducting light via one or more light conductors (e.g., optical fibers) present in one, the other, or both of the connector and connector-receiver. Those skilled in the art will readily appreciate the myriad of optical connectors and corresponding mating connector-receivers with which an detection system of the present disclosure can be used. Examples include, but are not limited to connectors such as straight tip (ST), avionics intermediate maintenance (Avio, Avim), ADT-UNI, DMI, E-2000 (a/k/a LSH), EC, enterprise system connection (ES-CON), F07, F-300, ferrule connector/fiber channel (FC), Fibergate, FSMA, Lucent connector/little connector/local connector (LC), ELIO, Lucxis, LX-5, media interface connector (MIC), Multiple-fiber push-on/pull-off (MPO/MTP), mechanical transfer (MT), mechanical transfer registered jack/media termination recommended jack (MT-RJ), miniature unit (MU), Opti-Jack, subscriber connector/square connector/standard connector (SC), sub-miniature A (SMA 905, SMA 906), subminiature C (SMC), Toshiba Link (TOSLINK), Volition Fiber (VF-45), broadcast connector interface (1053 HDTV), and V-System (V-PIN). Similarly, there are a multitude of non-optical connectors with which a detection system of the present disclosure can be used, including a myriad of electrical connectors, which are well known in the art. Fundamentally, there is no limitation on the type of mating connector/connector-receiver pair with which a detection system of the present disclosure can be used, except that the pair must have features that allow for the functionality of the present invention.

With some exemplary contexts for CES detection system 100 in mind, attention is now directed to components and features of the detection system. In the embodiment shown, CES detection system includes a detection-light source 116, a light sensor 120, and CES detection circuitry 124 that is in operative communication with at least the light sensor and, in some embodiment, also with the light source. Detection-light source 116 emits detection light 128, and light sensor 120 is designed and configured to detect detection light 128. Detection-light source 116 may comprise any one or more suitable light emitters, such as one or more electroluminescent light emitters (e.g., light-emitting diode (LED), organic LED (OLED), polymer LED (PLED), laser diode, etc.) or other type of light emitter, (e.g., Xenon bulb, plasma bulb, metal-halide bulb, or other gas-based bulb, optical fibers optically coupled to a remote light source, etc.) and may operate at any one or more suitable wavelengths, such as in the visible spectrum, ultraviolet spectrum, and/or infrared spectrum. In some embodiments, each light emitter or group of light emitters may include suitable optics (not shown) for focusing and/or collimating the emitted light. Fundamentally, there are no limitations on the wavelength or wavelength bands and nature (e.g., collimated or non-collimated) of detection light 128 other than they be able to provide the requisite functionality described herein. Light sensor 120 may comprise any one or more devices capable of detecting detection-light 128 and allowing the light sensor to distinguish between at least two amounts of the detection light for reasons described in detail below. Examples of devices suitable for use in light sensor 120 include, but are not limited to image sensors (e.g., charge-coupled devices, CMOS sensors, etc.), photodetectors, photodiodes, phototransistors, among others. Light sensor 120 may also include any additional circuitry as desired or needed, such as signal amplification circuitry, signal conditioning circuitry, and/or other signal processing circuitry.

Figure 3:
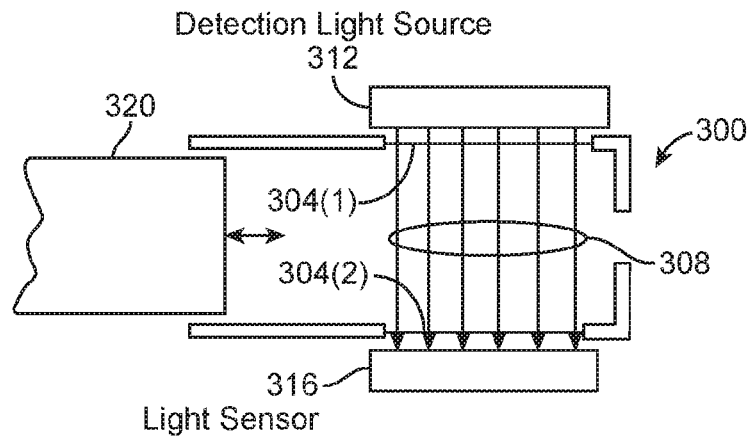
FIG. 3 is a longitudinal view of another CES detection system in the context of a connector-receiver and a mating connector, showing the connector-receiver as having a window to allow detection light to pass through the connector-receiver.

Detection-light source 116 and light sensor 120 are located relative to one another so that at least a portion of detection light 128 reaches the light sensor at all times that the detection-light source is emitting the detection light, regardless of whether connector 104 is properly engaged with connector-receiver or not. In some embodiments, such as illustrated in FIG. 3, the connector receiver, here, connector-receiver 300 (FIG. 3), may be provided with one or more windows, here, windows 304(1) and 304(2) that allow at least some of the detection light 308 to pass through the connector-receiver from the light source 312 to the light sensor 316 regardless of whether or not the connector, here, connector 320, is engaged within the connector-receiver or not. While some embodiments of connector-receiver may use one or more windows, other connector-receivers need not include any window(s) depending on their configurations.

Figure 2A:
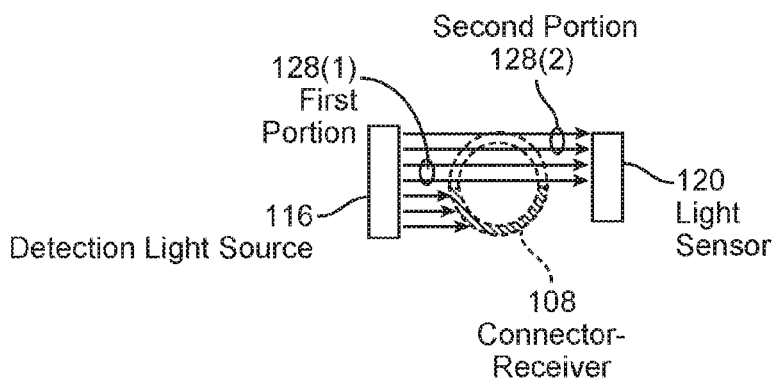
FIG. 2A is a front view of the CES detection system of FIGS. 1A and 1B, illustrating the passage of the detection light from the detector-light source to the light sensor when the connector is not present within the connector receiver, as also illustrated in FIG. 1A.

Referring again to the embodiment of FIGS. 1A and 1B and for the purpose of illustrating aspects of the present invention, detection light 128 is illustrated as including two spatial portions referred to herein as "first portion" 128(1) and "second portion" 128(2). In accordance with operating principles noted above, when connector 104 is fully disengaged from mating connector-receiver 108 (see FIGS. 1A and 2A), both first and second portions 128(1), 128(2) of detection light 128 reaches light sensor 120. However, when connector 104 is properly engaged with mating connector-receiver 108 (see FIGS. 1B and 2B), first portion 128(1) of detection light 128 is blocked from reaching light sensor 120 by the connector, but second portion 128(2) of the detection light reaches light sensor 120. As noted above, light sensor 120 is configured to distinguish between the two levels of detection light 128 reaching it, i.e., first and second portions 128(1), 128(2) together, and second portion 128(2) alone, and accordingly outputs a sensor-output signal 132 representing whichever light level is being sensed. It is noted that sensor-output signal 132 can be an analog signal (e.g., voltage or current level) or a digital signal, depending on the nature of light sensor 120. In addition to sensor-output signal 132 representing the amount of detection light 128 received by light sensor 120 in either of connector-fully-disengaged state and connector-properly-engaged state, the light sensor is also configured so that the sensor-output signal also indicates when none of the detection light is reaching the sensor. Depending on the configuration of CES detection system 100, connector-receiver 108, and or the apparatus (not shown) of which the CES detection system is a part, the no-detection-light state may correspond to, for example, no light reaching light sensor 120 at all or ambient light only reaching the light sensor. When no detection light 128 reaches light sensor 120, a fault, such as detection-light source 116 not emitting detection light 128, or other anomaly, such as connector-receiver 108 being damaged, exists.

By configuring CES detection system 100 and/or connector-receiver 108, etc., so that as long as the CES detection system is operating properly at least second portion 128(2) of detection light 128 always reaches light sensor 120, the CES detection system can provide fail-safe operation that would not be possible if all of the detection light, here, first and second portions 128(1), 128(2), were blocked by connector 104 when properly engaged with the connector-receiver. As those skilled in the art will readily appreciate, if all of detection light 128 were blocked upon full and proper engagement of connector 104 with connector-receiver 108, light sensor 120 would not detect any of the detection light. However, this detection condition is the same, for example, as when detection-light source 116 is not emitting detection light 128, such as can occur when the detection-light source is burned out or is not receiving power. In such a detection system, a fault condition would result in a false positive. That is, the detection system would mistake the no-detection-light condition from the fault for the no-detection-light condition of a connector-properly-engaged connector state. This could have devastating consequences if the detection system outputs a connector-properly-engaged signal when the actual cause of the no-detection-light condition is actually a fault and not the proper engagement of the connector. For example, if such a detection system turned on light source 112 based on light sensor 120 not detecting any of detection light 128, the detection system would turn the light source under a fault condition when connector 104 is not present.

CES detection circuitry 124 receives sensor-output signal 132 and is designed and configured to discern the differing detection-light-reception conditions represented in the sensor-output signal and to take appropriate actions accordingly. As those skilled in the art will appreciate, in some embodiments CES detection circuitry 124 may be executed purely in hardware or may be executed as a combination of hardware and software. Examples of hardware suitable for the latter include an application-specific integrated circuit (ASIC), a system on chip, and a general-purpose microprocessor in communication with one or more needed hardware components, such as one or more analog-to-digital converters, signal conditioner(s), signal amplifier(s), etc., depending on the nature of light sensor. As noted above, in some embodiments CES detection circuitry 124 may also be in communication with or otherwise control detection-light source 116. In such embodiments, CES detection circuitry 124 may include and/or be in communication with one or more digital-to-analog converters, switch(es), signal conditioner(s), signal amplifier(s), etc. Those skilled in the art will readily understand the many ways that CES detection circuitry 124 may be embodied.

Figure 2B:
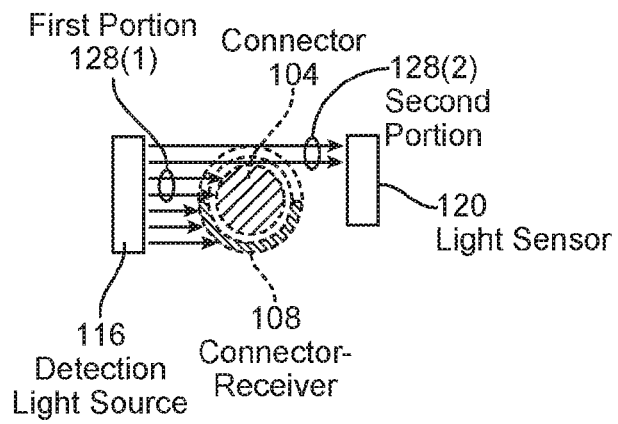
FIG. 2B is a front view of the CES detection system of FIGS. 1A and 1B, illustrating the blockage of a first portion of the detection light and the passage of a second portion the detection light, as also illustrated in FIG. 1B.

In the context of the example noted above having two detectable connector engagement states, namely, "disengaged state" in which connector 104 is fully disengaged from connector-receiver 108 (see FIGS. 1A and 2A) and "properly engaged state" in which the connector is properly and fully engaged with the connector-receiver (see FIGS. 1B and 2B). As described above, in the disengaged state both first and second portions 128(1) and 128(2) of detection light 128 reach light sensor 120, and in the properly engaged state connector 104 blocks the first portion of the detection light from reaching the light sensor, while the second portion of the detection light passes the connector and hits the light sensor. In an exemplary embodiment in which sensor-output signal 132 is a voltage that increases with increasing amounts of detected light (i.e., a "low-side" configuration), CES detection system 100 may have four overall connector engagement and fault states based on the sensor-output signal. In this example, these states may be: 1) a zero output state representing no detection light 128 reaching light sensor 120 and indicating a failure since some of detection light should always reach the light sensor; 2) a connector-not-inserted-threshold state (FIGS. 1A and 2A) representing both first and second portions 128(1) and 128(2) of the detection light reaching the light sensor and being, for example, a voltage greater than the voltage of the connector-inserted-threshold state (see below) but below the voltage of the high-voltage state; 3) a connector-inserted-threshold state (FIGS. 1B and 2B) representing only the second portion of the detection light reaching the light sensor and being, for example, a voltage greater than zero but lower than the voltage at the connector-not-inserted-threshold state; and 4) a high-voltage state, indicating a failure because there is not enough electrical signal to reach this level of voltage (possible indication of an open circuit).

In another embodiment in which sensor-output signal 132 of light sensor 120 decreases with increasing amounts of detected light (i.e., a "high-side" configuration), CES detection system 100 would have states different from the low-side configuration embodiment noted above. For example, the connector-not-inserted state would have a higher output voltage than the connector-inserted state. The Table below illustrates scenarios involving four distinct detection states.

| State | Description | Low-Side Configuration | High-Side Configuration | Equivalent Conductivity |
|---|---|---|---|---|
| 1 | Short Circuit Fault | Zero Output | Max Output | Very High Conductivity/ Apparent Short |
| 2 | Connector Not Inserted, Lots of Light | Below Threshold | Above Threshold | High Conductivity/ Light sensor Saturated |
| 3 | Connector Inserted, Some Light | Within Threshold | Within Threshold | Threshold Conductivity/ Active Region |
| 4 | Open Circuit Fault, or No light | Max Output | Zero Output | No Conductivity/ Cut-Off Region |

In addition, it is noted that a CES detection system of the present disclosure, such as CES detection system 100 of FIGS. 1A through 2C, is not limited to detecting four states.

On the contrary, any number of states suitable for making valid determinations of the state of engagement of a connector with a connector-receiver may be utilized. As an example of having fewer than four states, a particular embodiment may have three states, for example, state 1 being a threshold (window) representing a connector inserted fully into the connector-receiver (e.g., see FIGS. 1B and 2B), state 2 being below the threshold, and state 3 being above the threshold, with either state 2 or state 3 being a state representing a condition wherein a connector is not inserted, depending on the relationship between the magnitude of the output relative to the amount of light detected. In a particular implementation, a pair of comparators (not shown) could be used to detect and indicate the three states to suitable CES detection circuitry, such as circuitry 124 of FIGS. 1A and 1B. Under normal conditions with respect to the current embodiment, with state 2 representing the not-inserted state (FIGS. 1A and 2A, and using two bits to indicate the three states, only states 1 and 2, above, i.e., inserted and not inserted, would be sensed. State 3 indicates an actual failure of the CES detection system. In this configuration, states 1 and 2 in the low-side configuration, above, both fall into state 1 of this current example. As those skilled in the art will appreciate, more detection hardware could readily be added to make a distinction between states 2 and 3, or an analog-to-digital converter could be used to detect, for example, via firmware running on a processor, all four states noted in the previous embodiment above.

In yet other embodiments, more than four connector engagement and fault states may be utilized. Reasons for doing this include optimizing sensitivity and detecting "degrees" of connector engagement (e.g., fully disengaged, partially engaged, nearly fully engaged, fully engaged, etc.), among others. As a non-limiting example of the former, seven states could be provided, such as 1) short, 2) light sensor saturated (ideal for connector not inserted), 3) light sensor in active region above threshold, 4) light sensor in active region within threshold, 5) light sensor in active region below threshold, 6) light sensor in cutoff region, and 7) open circuit. An example of the latter includes a scenario illustrated in FIG. 2C in which detection light 128 can reach a light sensor 120 not only on one or more sides of connector 104 when the connector is present in connector-receiver 108, but also by passing through a gap 200 that can be present between a working end 204 of the connector and working end 208 of the connector-receiver. In this example, gap 200 is the spacing between connector 104 and connector-receiver 108 along the axis 212 of insertion of the connector into the connector-receiver, and its magnitude varies depending on the extent of insertion of the connector into the connector-receiver. In one example, full engagement (here, insertion) results in contact between working ends 204, 208 of connector 104 and connector-receiver 108, respectively, such that gap 200 is zero and, therefore, no detection light 128 passes through the gap.

Figure 2C:
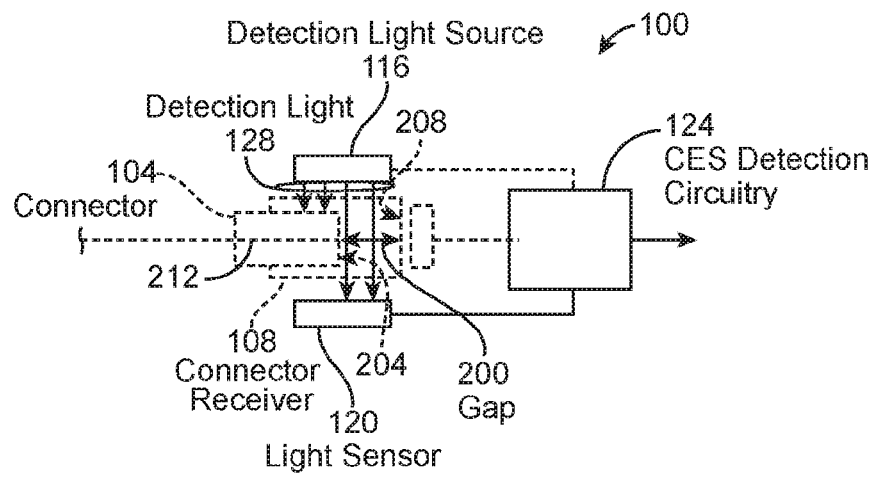
FIG. 2C is a top view of the CES detection system of FIGS. 1A and 1B, illustrating the passage of part of the first portion of the detection light when the connector is partially disengaged from the connector-receiver.

However, a partial engagement (here, insertion) of connector 104 with connector-receiver 108 as shown in FIG. 2C results in gap 200 being non-zero, thereby allowing at least some of first portion 128(1) of detection light 128, which is otherwise blocked by the connector, to reach light sensor 120. When light sensor 120 is designed and configured to detect the part of first portion 128(1) of detection light 128 and to distinguish this additional amount of light from the fully blocked state of full engagement of connector 104 (i.e., gap 200 being zero), CES detection circuitry 124 can identify such a nearly fully engaged state of connector and, if desired, take any appropriate action. For example, if connector 104 is an optical connector, such as an ST connector, that requires working end 204 to engage working end 208 of connector-receiver 108 for optimal light transmission, then when the connector is properly and fully engaged, gap 200 is zero. However, light can be transmitted between working ends 204, 208, even when a non-zero gap exists, though transmission is not optimal. Consequently, CES detection system 100 can be desired and configured to detect and handle additional engagement states. In this example, such additional engagement states may be 1) a fully inserted state (i.e., gap 200 is zero and CES detection circuitry 124 (FIG. 1A) allowing light source 112 to operate), 2) a partially inserted with decreased signal state (e.g., the gap being greater than zero but less than some predetermined magnitude and the CES detection circuitry allowing the light source to operate), and 3) a partially inserted but non-functional state (e.g., the gap being equal to or greater than the predetermined magnitude and the CES detection circuitry causing the light source to turn off), among others, with these states being determined using the amount of first portion 128(1) of detection light 128 passing through gap 200 when connector 104 is present within connector-receiver. Those skilled in the art will readily be able to implement such states by selecting one or more gap locations appropriate for the connector/connector-receiver pair at issue.

CES detection circuitry 124 may be designed and configured to output a suitable CES detection signal 136 that contains information about the current state of engagement of connector 104 and/or fault with CES detection system 100. CES detection signal 136 can be used for any one or more of a variety of purposes. For example, with suitable hardware (not shown) CES detection signal 136 can be used to control light source 112 or other component, notifying a user of the current state of engagement and/or fault, and inform a piece of equipment, such as a status monitor, server, etc., of current conditions, among other. Those skilled in the art will readily appreciate the uses of state and/or fault information contained in DES detection signal 136.

In some embodiments, non-detection light, such as stray light, unintended light, ambient light, and/or light generated by the piece of equipment at issue (such as light from light source 112 (FIG. 1A), e.g., when gap 200 (FIG. 2C) is present), if any, can interfere with the detection of the detection light by the light source. In these embodiments, interference from non-detection light can be mitigated in any of a variety of ways, including modulating the light energy, tailoring the intensity, and/or tailoring the wavelength(s) of the detection light. If modulation is used, in some embodiments, detection-light source 116 may comprise emitter driver circuitry (not shown) that controls the modulation by modulating the power to the emitter(s). Alternatively, detection-light source 116 may include, for example, a mechanical chopper or optical attenuator for modulating detection light 128. In some embodiments, the CES detection circuitry at issue, such as CES detection circuitry 124 of FIG. 1A, may itself be designed and configured to control detection-light source 116 to emit detection light 128 with the desired modulation. Correspondingly, light sensor 120 may be designed and configured so that sensor-output signal 132 contains corresponding modulation for use by CES detection circuitry 124 or so as to condition or otherwise modify or convert the modulations to another signal representative of the detected. In either case, CES detection circuitry 124 may be designed and configured to recognize sensor-output signal 132 and take any appropriate action.

As noted above, in some embodiments detection light 128 may be modulated at a known frequency and/or with a desired pattern. Light sensor 120 may include internal circuitry that then demodulates a resulting internal detection signal electrically to decrease or eliminate the portion of the internal signal caused by non-detection light. Light sensor 120 may then output this modified signal as sensor-output signal 132 that CES detection circuitry 124 then uses for its state recognition and other operations. In the context of the foregoing example in which CES detection system 100 has a low-side configuration (see the Table), non-detection light would demodulate to zero volts as they do not match the predetermined modulation of detection light 128. Those skilled in the art will understand how to implement a wide variety of modulation-based schemes for filtering or otherwise accounting for non-detection-light interference. The intensity of detection-light source 116 can be controlled by suitably selecting one or more particular emitters and selecting a driving power, and one or more particular wavelengths can be selected by appropriate choice of the emitter(s) for the detection-light source. CES detection circuitry 124 can control detection-light source 116 to control the intensity of detection light 128, and in some embodiments, the CES detection circuitry can control the detection-light source to control the wavelength(s) of detection light. Those skilled in the art will understand how to implement any one, and any combination, of these non-detection-light compensation schemes.

In embodiments in which CES detection circuitry 124 includes one or more microprocessors, CES detection system 100 can be calibrated after installation and under actual field conditions. For example, CES detection system 100 can be designed and configured to prompt a user to properly and fully engage connector 104 with connector-receiver 108. In this embodiment, once the user indicates to CES detection system 100 that connector 104 is fully engaged with connector-receiver 108, the microprocessor(s) could use sensor-output signal 132 to establish the corresponding value of the sensor-output signal as the value CES detection circuitry 124 should use for indicating a connector-fully-engaged state during routine operation of the CES system. Similarly, CES detection system 100 can also be designed and configured to prompt a user to fully disengage connector 104 from connector-receiver 108 and similarly "record" the resulting value of sensor-output signal 132, which CES detection circuitry 124 could then use for indicating a connector-fully-disengaged state during routine operation of the CES system. Any other state(s) of engagement, such as nearly fully engaged, could also be programmed in a similar manner. A benefit to this field programming is that CES detection system 100 can be set up, in situ, to compensate for any non-detection light that is anticipated to be present during routine use of connector 104 and connector-receiver 108. For fault states, CES detection circuitry 124 can be designed and configured, for example, to cause a zero-voltage state by depowering light sensor 120 or other component of CES detection system 100 and to open a circuit, such as by actuating an analog switch (not shown), and then measure a high-voltage state, among other things. Consequently, in some embodiments, some or all connector engagement and fault states can be measured and customized. In other microprocessor-based embodiments, CES detection circuitry 124 can learn, measure, and store connector engagement and fault states at the factory and can also maintain an average or some other filtered value over time to allow the detection circuitry to compensate for effects of aging, such as the aging of light source 116 and/or light sensor 120.

Figure 4:
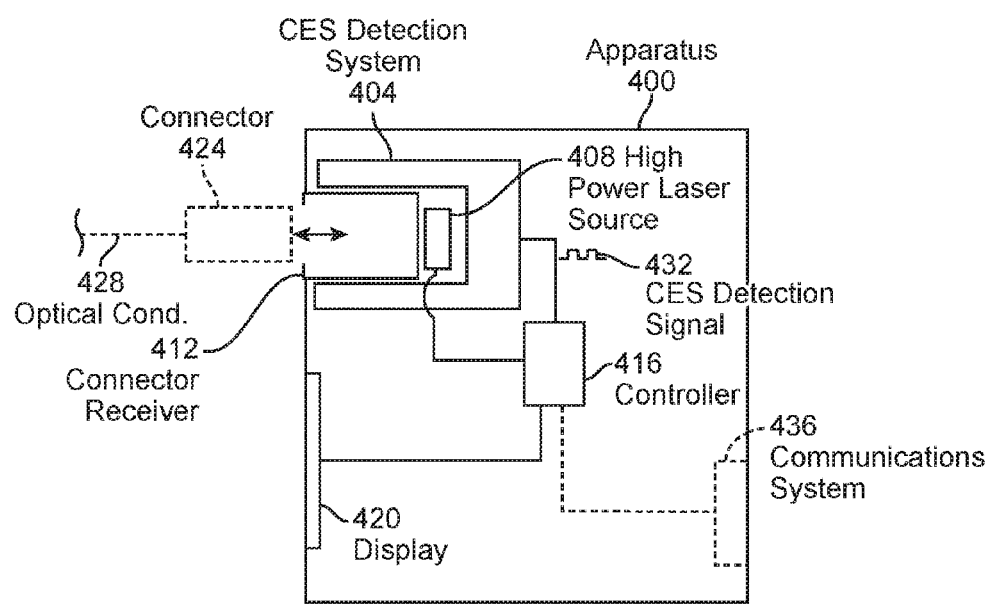
FIG. 4 is a high-level schematic diagram of an exemplary apparatus that includes a CES detection system of the present disclosure.

FIG. 4 illustrates an exemplary apparatus 400 that includes a CES detection system 404 made in accordance with the present invention. Apparatus 400 may be, for example, a piece of standalone equipment, such as an endoscope base unit, a general laser source, a power supply, fiber-optic-communications equipment, Internet switch, Internet router, among many others. In this example, in addition to CES detection system 404, apparatus 400 includes a high-power laser source 408, a connector-receiver 412, a controller 416, and an onboard display 420. Connector-receiver 412 is provided to receive a corresponding mating connector 424 of an optical conductor 428 so as to allow the conductor to conduct light (not shown) from laser source 408 to another location, such as a working end of an endoscope, another piece of equipment, etc. Connector-receiver 412 and connector 424 may be the same as or similar in any one or more aspects to, respectively, connector-receiver 108 and connector 104 of FIGS. 1A through 2C, described above.

In this example, controller 416 may control the operation of laser source 408, as well as information displayed on display 420, which may be a graphical display, such as a liquid crystal display, LED display, OLED display, PLED display, plasma display, touch screen, or other type of graphical display, among others. In some embodiments, display 420 may form part of the primary user interface for a user to control the operation of apparatus 400 and/or one or more components thereof and/or to view various status information concerning the apparatus and/or one or more components thereof, among other things. Controller 416 may also be in communication with CES detection system 404 for any one or more of a variety of purposes. For example, central controller 416 may receive a CES detection signal 432 from CES detection system 404 that indicates the state of engagement of connector 424 with connector-receiver 412 and, if present, whether or not a fault is present within the detection system itself. In this connection, CES detection system 404 may be the same as or similar to CES detection system 100 of FIGS. 1A through 2C described above.

Controller 416 may be designed and configured to take one or more specific actions as a function of the value of CES detection signal 432 from CES detection system 404. For example, controller 416 may be programmed to control the operating state of laser source 408 as a function of the state of engagement of connector 424 with connector-receiver 412 and/or the detection of a fault within CES detection system 404, as communicated by CES detection signal 432. In the context of the four detection states of 1) connector fully disengaged, 2) connector properly engaged, 3) no-detection-light-detected, and 4) short-circuit detected that CES detection signal 432 conveys to controller 416, the central controller may be designed and configured to turn on laser source 408 only when CES detection signal 432 indicates the connector-properly-engaged state, turning-off the laser source and/or keeping the laser source turned off when the CES detection signal indicates any of the other three states. Correspondingly, controller 416 may also be designed and configured to provide a detected state indication to a user, such as via display 420. For example, controller 416 may cause display 420 to display status information, such as: "No Connector Present" when CES detection signal indicates state 1 immediately above; "Connector Engaged" when the CES detection signal indicates state 2 immediately above; "Check CES Detection System—No Detection Signal" when the CES detection signal indicates state 3; and "Check CES Detection System—Short Circuit Detected" when the CES detection signal indicates state 4. Of course, these examples are only exemplary and non-limiting. Those skilled in the art will readily understand how to implement many other status indicators. In other embodiments, display 420 may simply be one or more status lights or other indicators.

In some embodiments in which connector engagement and fault status information is needed and/or used at a location remote from apparatus 400, the apparatus may further comprise a communications system 436 that allows CES detection signal 432 or other status information (such as status information generated by controller 416 based on interpreting CES detection signal 432) to be communicated off-board of the apparatus. An example of such an embodiment is when apparatus 400 is part of a communications network and is located remotely from a central or regional status system (not shown) that monitors the status of equipment and connections throughout the network or portion thereof. In this example, communications system 436 can communicate status information based on CES detection signal 432 to that status system. To further illustrate such an implementation, a lack of signal or degraded signal in the communications network coupled with any state not indicating proper (i.e., operational) connector engagement could pinpoint a possible location of the problem, for example, a disengaged or partially engaged connector at the connector-receiver of the equipment where such state is occurring, here a disengaged or partially engaged state of connector 424 with connector-receiver 412 of apparatus 400. On the other hand, if the detected state of the connector is fully engaged, then the location of that connector/connector-receiver connection might be ruled out as a source of the problem. Communications system 436 may be a hardwired system, such as a universal serial bus (USB) port, FireWire port, or any other type of wired (including optical fiber) connector port, or a wireless system, such as a radio-frequency transmitter or transceiver, infrared transmitter or transceiver, etc. Fundamentally, there is no limitation on the physical construct of communications system 436. Communications system 436 may be in communication with central controller 416 or other component of apparatus 400.

Central controller 416 may also be designed and configured to interact with CES detection system 404 for any one or more of a variety of reasons. For example, central controller 416 may be designed and configured to facilitate calibration of CES detection system 404 as described above, such as utilizing display 420 to provide the necessary user prompts and receive the necessary user input for the calibration process. As another example, central controller 416 may further or alternatively be designed and configured to control the operating state of CES detection system 404, such as by turning the CES detection system on only when apparatus 400 itself is on. In some embodiments, central controller 416 may also be designed and configured to allow a user to set any user-settable parameters of CES detection system 404, such as setting the number and/or type of detectable engagement states, setting one or more aging factors, setting one or more parameters that account for non-detection light and/or one or more environmental or operating factors, among others. As those skilled in the art will readily appreciate, central controller 416 will typically be most efficiently embodied with appropriate hardware and software, such as a combination of a computing system, for example, an AISC, system on chip, general-purpose microprocessor, with firmware or other software instructions.

Figure 5:
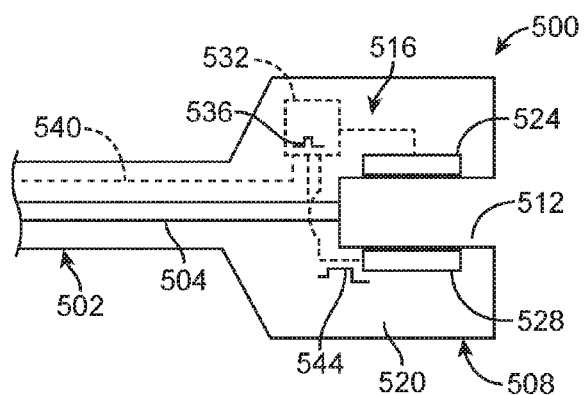
FIG. 5 is a schematic diagram of an exemplary cable assembly that includes components of a CES detection system of the present disclosure.

FIG. 5 illustrates an exemplary cable assembly 500 that incorporates connector-engagement-state features and functionality of the present disclosure. In this embodiment, cable assembly includes a cable 502 containing one or more conductors 504 and a connection end 508 having a connector-receiver 512 for matingly receiving a corresponding connector (not shown). Each conductor 504 may be, for example, an optical conductor or an electrical conductor. Connector-receiver 512 and the mating connector may be the same as or similar to, respectively, connector-receiver 108 and connector 104 of FIGS. 1A through 2C. Cable assembly 500 also includes a CES detection system 516 or at least several components of such a detection system. In the embodiment shown, the various components of CES detection system 516 are contained within a common enclosure 520 at connection end 508 of cable assembly 500.

CES detection system 516 includes a light source 524, a light sensor 528, and CES detection circuitry 532. Each of these components of CES detection system 516 may be the same as or similar to the corresponding components of CES detection system 100 of FIGS. 1A through 2C. For an understanding of how light source 524, light sensor 528, and CES detection circuitry 532 work together to provide connector engagement and fault state information, the reader is referred to the above description of CES detection system 100, above. In the embodiment shown in FIG. 5, CES detection circuitry 532 is shown as being located onboard cable assembly 500, here, within enclosure 520. In this embodiment, CES detection circuitry 532 may generate and output a CES detection signal 536 that may be the same as or similar to CES detection signal 432 of CES detection system 404 of FIG. 4. Because connection end 508 is naturally remote from any equipment or other apparatus to which it is connected, CES detection signal 536 is typically transmitted to one or more status monitors (not shown) or other devices designed and configured to receive and utilize the CES detection signal, for example, to alert one or more users and/or to control the operation of one or more pieces of equipment and/or components thereof, such as in the manner described above in connection with controller 416 of apparatus 400 of FIG. 4. CES detection signal 536 of FIG. 5 may be transmitted to such receiver(s), for example, via a dedicated communications channel 540 (e.g., wire) within cable 502, via conductor(s) 504, or via a wireless communications system (not shown) that is part of cable assembly 500. It is noted that depending on the location of connection end 508 within a system (not shown) that utilizes cable assembly 500, when CES detection signal 536 is not transmitted wirelessly, it may be transmitted along cable 502 and/or through the mating connector (not shown). In other embodiments, CES detection circuitry 532 may be located remotely from connection end 508, with a sensor-output signal 544 being transmitted to the remote CES detection circuitry in any suitable manner, such as any of the manners described above relative to CES detection signal 536.

As those skilled in the art will readily understand, state determination and monitoring and any control, display, and/or other algorithms that may be implemented that use state information from a CES detection system of the present invention may be implemented in software in any suitable form, such as firmware or one or more software modules of a larger control application.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Figure 6:
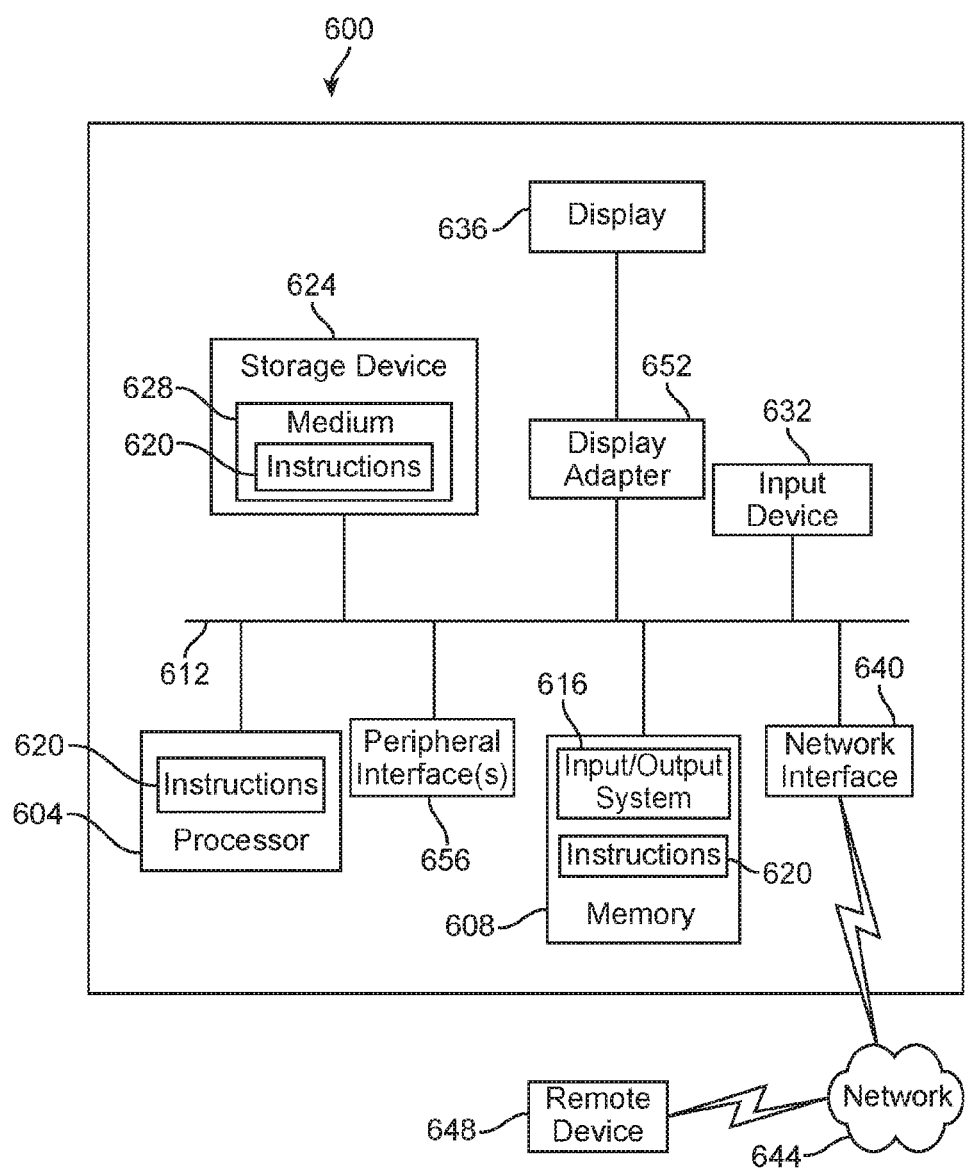
FIG. 6 is a high-level diagram of a computing system for performing any one or more of the methodologies of the present invention and/or any portion(s) thereof.

FIG. 6 shows a diagrammatic representation of one embodiment of a computer system 600 within which a set of instructions for causing a CES detection system, such as CES detection system 100 of FIG. 1, CES detection system 404 of FIG. 4, and CES detection system 516 of FIG. 5, and/or a controller, such as controller 416 of FIG. 4, to perform any one or more of the aspects and/or methodologies of the present disclosure. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine readable media) including, but not limited to, a random access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, an LED display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

In addition to the foregoing embodiments and the appended claims, following are some additional exemplary embodiments.

In a first additional embodiment, a cable assembly that comprises a cable that includes: a primary conductor designed and configured to conduct at least one primary signal; and an end. The cable assembly also comprises a cable end-connector secured to the cable at the end and designed and configured for receiving a connector. The cable end-connector comprises: a connector receiver designed and configured to receive the connector and, when the connector is fully engaged with the connector receiver, provide a path for the at least one primary signal between the connector and the primary conductor; a detection-light source fixed relative to the connector receiver, the detection-light source designed and configured to emit detection light; and a light sensor fixed relative to each of the connector receiver and the detection-light source, the light sensor designed and configured to detect light of the detection light and to generate an output signal that is proportional to an amount of light reaching the light sensor; wherein the detection-light source and the light sensor are located relative to one another and relative to the connector receiver and the connector so that, when the connector is fully engaged with the connector receiver and the detection-light source is operating, the connector blocks a first portion of the detection light from reaching the light sensor and allows a second portion of the detection light to reach the light sensor.

In a second additional embodiment, a cable assembly according to the first additional embodiment, further comprising connector-engagement-state (CES) circuitry in operative communication with the light sensor and the secondary conductor, the CES detection circuitry designed and configured to, based on the output signal of the light sensor, 1) determine the state of engagement of the connector with the connector receiver and 2) identify a possible fault with at least one of the detection-light source and the light sensor.

In a third additional embodiment, a cable assembly according to the second additional embodiment, wherein the state of engagement is: fully engaged when the second portion of the detection light reaches the light sensor and the first portion of the detection light does not reach the light sensor; and not engaged when both the first and second portions of the detection light reaches the light sensor.

In a fourth additional embodiment, a cable assembly according to the third additional embodiment, wherein the state of engagement is partially engaged when the connector blocks between 0% and 100% of the first portion of the detection light from reaching the light sensor.

In a fifth additional embodiment, a cable assembly according to the third additional embodiment, wherein the possible fault is a no-light fault when neither of the first and second portions of the detection light reaches the light sensor.

In a sixth additional embodiment, a cable assembly according to the third additional embodiment, wherein the possible fault is a short-circuit fault.

In a seventh additional embodiment, a cable assembly according to the second additional embodiment, wherein the possible fault is a no-light fault when neither of the first and second portions of the detection light reaches the light sensor.

In an eighth additional embodiment, a cable assembly according to the second additional embodiment, wherein the CES detection circuitry is designed and configured to modulate the detection light to inhibit influence of ambient light on the CES detection circuitry determining the state of engagement.

In a ninth additional embodiment, a cable assembly according to the second additional embodiment, wherein the light sensor is subject to ambient light during operation of the system, the detection-light source designed and configured to output the detection light at one or more wavelengths selected to allow the CES detection circuitry to inhibit influence of ambient light on the CES detection circuitry determining the state of engagement.

In a tenth additional embodiment, a cable assembly according to the second additional embodiment, wherein the light sensor is subject to ambient light during operation of the system, the detection-light source designed and configured to output the detection light at an intensity selected to allow the CES detection circuitry to inhibit influence of ambient light on the CES detection circuitry determining the state of engagement.

In an eleventh additional embodiment, a cable assembly according to the first additional embodiment, wherein the light sensor is designed and configured to saturate when the first and second portions of the detection light reach the light sensor.

In a twelfth additional embodiment, a cable assembly according to the first additional embodiment, wherein the connector is an optical connector and the connector receiver is an optical connector receiver.

In a thirteenth additional embodiment, a cable assembly according to the first additional embodiment, wherein the connector receiver includes at least one window designed and configured to 1) allow the first and second portions of the detection light to reach the light sensor when the connector is not engaged with the connector receiver and 2) allow the second portion of the detection light to reach the light sensor when the connector is engaged with the connector receiver and is blocking the first portion of the detection light.

In a fourteenth additional embodiment, a cable assembly according to the thirteenth additional embodiment, wherein the detection-light source and the light sensor are located on opposite sides of the at least one window.

Exemplary embodiments have been disclosed above and illustrated in the accompanying drawings. It will be understood by those skilled in the art that various changes, omissions and additions may be made to that which is specifically disclosed herein without departing from the

What is claimed is:

1. A system for determining state of engagement of an opaque connector with a connector receiver, the system comprising:
   a detection-light source fixed relative to the connector receiver, said detection-light source designed and configured to emit detection light when the system is operating; and
   a light sensor fixed relative to each of the connector receiver and said detection-light source, said light sensor designed and configured to detect light of the detection-light source when the system is operating and to generate an output signal that is proportional to an amount of light reaching said light sensor;
   wherein said detection-light source and said light sensor are located relative to one another and relative to the connector receiver and the opaque connector so that, when the opaque connector is fully engaged with the connector receiver and the system is operating, the opaque connector blocks a first portion of the detection light from reaching said light sensor but does not block a second portion of the detection light, allowing the second portion of the detection light to pass adjacent to the opaque connector and reach said light sensor.

2. A system according to claim 1, further comprising connector-engagement-state (CES) circuitry in operative communication with said light sensor, said CES detection circuitry designed and configured to, based on the output signal of said light sensor, 1) determine the state of engagement of the opaque connector with the connector receiver and 2) identify a possible fault within the system.

3. A system according to claim 2, wherein the state of engagement is:
   fully engaged when the second portion of the detection light reaches said light sensor and the first portion of the detection light does not reach said light sensor; and
   not engaged when both the first and second portions of the detection light reaches said light sensor.

4. A system according to claim 3, wherein the state of engagement is partially engaged when the opaque connector blocks between 0% and 100% of the first portion of the detection light from reaching said light sensor.

5. A system according to claim 3, wherein the possible fault is a no-light fault when neither of the first and second portions of the detection light reaches said light sensor.

6. A system according to claim 3, wherein the possible fault is a short-circuit fault.

7. A system according to claim 2, wherein the possible fault is a no-light fault when neither of the first and second portions of the detection light reaches said light sensor.

8. A system according to claim 2, wherein said CES detection circuitry is designed and configured to modulate the detection light to inhibit influence of ambient light on said CES detection circuitry determining the state of engagement.

9. A system according to claim 2, wherein said light sensor is subject to ambient light during operation of the system, said detection-light source designed and configured to output the detection light at one or more wavelengths selected to allow said CES detection circuitry to inhibit influence of ambient light on said CES detection circuitry determining the state of engagement.

10. A system according to claim 2, wherein said light sensor is subject to ambient light during operation of the system, said detection-light source designed and configured to output the detection light at an intensity selected to allow said CES detection circuitry to inhibit influence of ambient light on said CES detection circuitry determining the state of engagement.

11. A system according to claim 1, wherein said light sensor is designed and configured to saturate when said first and second portions of the detection light reach said light sensor.

12. A system according to claim 1, wherein the opaque connector is an optical connector and the connector receiver is an optical connector receiver.

13. A system according to claim 1, wherein the connector receiver includes at least one window designed and configured to 1) allow the first and second portions of the detection light to reach said light sensor when the opaque connector is not engaged with the connector receiver and 2) allow the second portion of the detection light to reach said light sensor when the opaque connector is engaged with the connector receiver and is blocking the first portion of the detection light.

14. A system according to claim 13, wherein said detection-light source and said light sensor are located on opposite sides of the at least one window.

15. An apparatus, comprising:
a connector receiver designed and configured to receive an opaque connector;
a connector-engagement-state (CES) system that includes:
a detection-light source fixed relative to said connector receiver, said detection-light source designed and configured to emit detection light when said CES system is operating;
a light sensor fixed relative to each of said connector receiver and said detection-light source, said light sensor designed and configured to detect light of the detection light when said CES system is operating and to generate an output signal that is proportional to an amount of light reaching said light sensor;
wherein said detection-light source and said light sensor are located relative to one another and relative to said connector receiver and the opaque connector so that, when the opaque connector is fully engaged with said connector receiver and said CES system is operating, the opaque connector blocks a first portion of the detection light from reaching said light sensor but does not block a second portion of the detection light, allowing the second portion of the detection light to pass adjacent to the opaque connector and reach said light sensor; and
CES detection circuitry in operative communication with said light sensor, said CES detection circuitry designed and configured to, based on the output signal of said light sensor, 1) determine the state of engagement of the opaque connector with said connector receiver and 2) identify a possible fault within said CES system.

16. An apparatus according to claim 15, wherein said CES detection circuitry is designed and configured to generate, when applicable, a status signal representing 1) the state of engagement or 2) the possible fault.

17. An apparatus according to claim 16, further comprising a CES status indicator designed and configured to indicate, when applicable and based on the status signal, 1) the state of engagement or 2) the possible fault.

18. An apparatus according to claim 16, further comprising:
a light output device designed and configured to provide output light to the opaque connector when the opaque connector is fully engaged with said connector receiver, said light output device having an operating state during operation of the apparatus; and
a controller operatively connected to said output device, said controller designed and configured to control the operating state of the light output device as a function of the status signal from the CES detection circuitry.

19. An apparatus according to claim 18, wherein said light output device is a laser light source.

20. An apparatus according to claim 18, wherein, when the status signal indicates that the opaque connector is not fully engaged with said connector receiver, said controller controls said output device so that said light output device does not provide the output light to said connector receiver.

21. An apparatus according to claim 15, wherein the state of engagement is:
fully engaged when the second portion of the detection light reaches said light sensor and the first portion of the detection light does not reach said light sensor; and
not engaged when both the first and second portions of the detection light reaches said light sensor.

22. An apparatus according to claim 21, wherein the state of engagement is partially engaged when the opaque connector blocks between 0% and 100% of the first portion of the detection light from reaching said light sensor.

23. An apparatus according to claim 21, wherein the possible fault is a no-light fault when neither of the first and second portions of the detection light reaches said light sensor.

24. An apparatus according to claim 21, wherein the possible fault is a short-circuit fault.

25. An apparatus according to claim 15, wherein the possible fault is a no-light fault when neither of the first and second portions of the detection light reaches said light sensor.

26. An apparatus according to claim 15, wherein said CES detection circuitry is designed and configured to modulate the detection light to inhibit influence of ambient light on said CES detection circuitry determining the state of engagement.

27. An apparatus according to claim 15, wherein said light sensor is subject to ambient light during operation of said CES system, said detection-light source designed and configured to output the detection light at one or more wavelengths selected to allow said CES detection circuitry to inhibit influence of ambient light on said CES detection circuitry determining the state of engagement.

28. An apparatus according to claim 15, wherein said light sensor is subject to ambient light during operation of the system, said detection-light source designed and configured to output the detection light at an intensity selected to allow said CES detection circuitry to inhibit influence of ambient light on said CES detection circuitry determining the state of engagement.

29. An apparatus according to claim 15, wherein said light sensor is designed and configured to saturate when the first and second portions of the detection light reach said light sensor.

30. An apparatus according to claim 15, wherein the opaque connector is an optical connector and said connector receiver is an optical connector receiver.

31. An apparatus according to claim 15, wherein said connector receiver includes at least one window designed and configured to 1) allow the first and second portions of the detection light to reach said light sensor when the opaque connector is not engaged with said connector receiver and 2) allow the second portion of the detection light to reach said light sensor when the opaque connector is engaged with said connector receiver and is blocking the first portion of the detection light.

32. An apparatus according to claim 31, wherein said detection-light source and said light sensor are located on opposite sides of said at least one window.

\* \* \* \* \*